US008811986B2

(12) United States Patent
Venkatachalam et al.

(10) Patent No.: US 8,811,986 B2
(45) Date of Patent: Aug. 19, 2014

(54) CELL RESELECTION MECHANISM FOR A BASE STATION WITH CLOSED SUBSCRIBER GROUP

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 12/886,764

(22) Filed: Sep. 21, 2010

(65) Prior Publication Data
US 2011/0111757 A1    May 12, 2011

Related U.S. Application Data

(60) Provisional application No. 61/259,086, filed on Nov. 6, 2009.

(51) Int. Cl.
| | |
|---|---|
| *H04W 4/00* | (2009.01) |
| *H04W 60/04* | (2009.01) |
| *H04W 36/14* | (2009.01) |
| *H04W 36/00* | (2009.01) |
| *H04W 48/20* | (2009.01) |
| *H04W 72/04* | (2009.01) |
| *H04W 74/00* | (2009.01) |
| *H04W 76/02* | (2009.01) |
| *H04W 84/04* | (2009.01) |

(52) U.S. Cl.
CPC ............. *H04W 60/04* (2013.01); *H04W 36/14* (2013.01); *H04W 36/0072* (2013.01); *H04W 48/20* (2013.01); *H04W 72/042* (2013.01); *H04W 74/004* (2013.01); *H04W 76/028* (2013.01); *H04W 84/045* (2013.01)

USPC .............. 455/435.1; 455/422.1; 455/434; 455/435.2; 455/436; 455/437; 455/438; 455/448; 455/449; 455/450; 370/328; 370/329; 370/330; 370/331

(58) Field of Classification Search
CPC ............ H04W 72/042; H04W 74/004; H04W 74/0833; H04W 48/16; H04W 48/18; H04W 36/00072; H04W 36/14; H04W 48/12; H04W 48/20; H04W 76/028; H04W 84/045; H04W 60/04
USPC ......... 370/332, 333, 334, 335, 336, 337, 338, 370/328–331; 455/422.1, 424, 425, 432.1, 455/432.3, 434, 435.1, 435.2, 435.3, 436, 455/448, 449, 450, 451, 452.1, 452.2, 455/437–444
See application file for complete search history.

(56) References Cited

U.S. PATENT DOCUMENTS 8,289,889 B2 * 10/2012 Lee et al. ........................ 370/278
8,310,921 B2 * 11/2012 Cho et al. ....................... 370/229
(Continued)

FOREIGN PATENT DOCUMENTS

| CN | 101505476 A | 8/2009 |
|---|---|---|
| DE | 10 2007 062 840 A1 | 7/2009 |

(Continued)

OTHER PUBLICATIONS

Combined Search and Examination Report Received for United Kingdom Divisional Application No. GB 1207215.3, mailed Aug. 23, 2012, 4 pages of Search Report.

(Continued)

*Primary Examiner* — Olumide T Ajibade Akonai
(74) *Attorney, Agent, or Firm* — Kacvinsky Daisak Bluni PLLC

(57) ABSTRACT

Embodiments of systems and methods for cell selection in a wireless network are generally described herein. Other embodiments may be described and claimed.

18 Claims, 3 Drawing Sheets

(56) References Cited

U.S. PATENT DOCUMENTS

| | | | |
|---|---|---|---|
| 8,310,946 B2* | 11/2012 | Somasundaram et al. | 370/252 |
| 2006/0239241 A1* | 10/2006 | Eom et al. | 370/348 |
| 2008/0049674 A1* | 2/2008 | Cha et al. | 370/331 |
| 2009/0093232 A1* | 4/2009 | Gupta et al. | 455/410 |
| 2009/0264126 A1* | 10/2009 | Khetawat et al. | 455/435.1 |
| 2009/0275326 A1 | 11/2009 | Lee et al. | |
| 2010/0098025 A1* | 4/2010 | Chen et al. | 370/331 |
| 2010/0190498 A1 | 7/2010 | Ha et al. | |

FOREIGN PATENT DOCUMENTS

| | | | |
|---|---|---|---|
| EP | 2398266 A2 | 12/2011 | |
| WO | 2005/074315 A1 | 8/2005 | |
| WO | 2008/134281 A2 | 11/2008 | |
| WO | 2009/132598 A1 | 11/2009 | |
| WO | 2010/079909 A2 | 7/2010 | |
| WO | 2010/137836 A2 | 12/2010 | |

OTHER PUBLICATIONS

Office Action Received in Great Britain Application No. GB1018598.1, mailed Mar. 1, 2012, 2 pages.

Office Action Received in Japanese Application No. 2010-231835, mailed Apr. 3, 2012, 3 pages, including 2 pages of English translation.

Combined Search and Examination Report receeived for United Kingdom Patent Application No. 1018598.1, mailed on Feb. 28, 2011, 7 pages.

Office Action received for Germany Patent Application No. 10 2010 047 723.0, mailed on Aug. 11, 2011, 6 pages of Germany office action and 6 pages of English translation.

Office Action received for German Patent Application No. 102010047723.0, mailed Jul. 18, 2013, 13 pages including 2 pages English translation.

IEEE Standard for Local and metropolitan area networks, Part 16: Air interface for Broadband Wireless Access Systems, pp. 1-5, 47-55 and 317 (2009) amendment to IEEE 802.16 (2004).

IEEE Standard for Local and metropolitan area networks, Part 16: Air interface for Broadband Wireless Access Systems, Amendment 2: Physical and Medium Access Control Layers for Combined Fixed and Mobile Operation in Licensed Bands and Corrigendum 1, IEEE Std. 802.16e. (2005).

Office Action received for Chinese Patent Application No. 201010543955.3, mailed Oct. 18, 2013, 17 pages including 11 pages English translation.

Srinivasan et al., "IEEE 802.16m System Description Document (SDD)", Intel Corporation, submitted Sep. 3, 2009, 175 pages.

Xie et al., "Femto AWD Text Proposal for 15.4.7 Network Entry", ZTE Corporation, submitted Sep. 2, 2009, 4 pages.

Office Action received for Chinese Patent Application No. 201010543955.3, mailed Apr. 1, 2013, 15 pages.

Office Action received for Chinese Patent Application No. 201010543955.3, mailed May 9, 2014, 18 pages including 10 pages English translation.

* cited by examiner

CELL RESELECTION MECHANISM FOR A BASE STATION WITH CLOSED SUBSCRIBER GROUP

CLAIM OF PRIORITY

The present application claims priority to U.S. Patent Application No. 61/259,086, filed Nov. 6, 2009, the entire disclosure of which is hereby incorporated by reference in its entirety.

FIELD OF THE INVENTION

This application relates to wireless systems and, more particularly, to improving selection of one or more base stations in a wireless network.

BACKGROUND

In wireless communications systems, a wireless device such as a mobile station (MS) usually performs network entry with an access point (AP) or base station (BS) to access a wireless network. The network entry procedure is established over a channel, or a primary carrier, with the AP.

Femto access points (FAP) such as WiMAX FAP (WFAP) are relatively low-power, low-cost, and low complexity cellular network WFAPs that are connected to a network service provider's core network through home, small office-home office (SOHO) and commercial environments. The WFAPs provide network access through a cell to an open group of users such as an open subscriber group (OSG) or closed group of users such as a closed subscriber group (CSG). The cell, such as a WiMAX femtocell, is a system comprising a WFAP and other additional network entities to provide network service to the MS through the WFAP.

Since the WFAPs can be densely deployed, use of typical cell selection methods which are used for initial network entry/re-entry or handover for AP or BS can be cumbersome, adds to overhead in system operations, and increases MS power consumption and complexity.

BRIEF DESCRIPTION OF THE DRAWINGS

The present invention is illustrated by way of example and not as a limitation in the figures of the accompanying drawings, in which.

DETAILED DESCRIPTION

Figure 1:
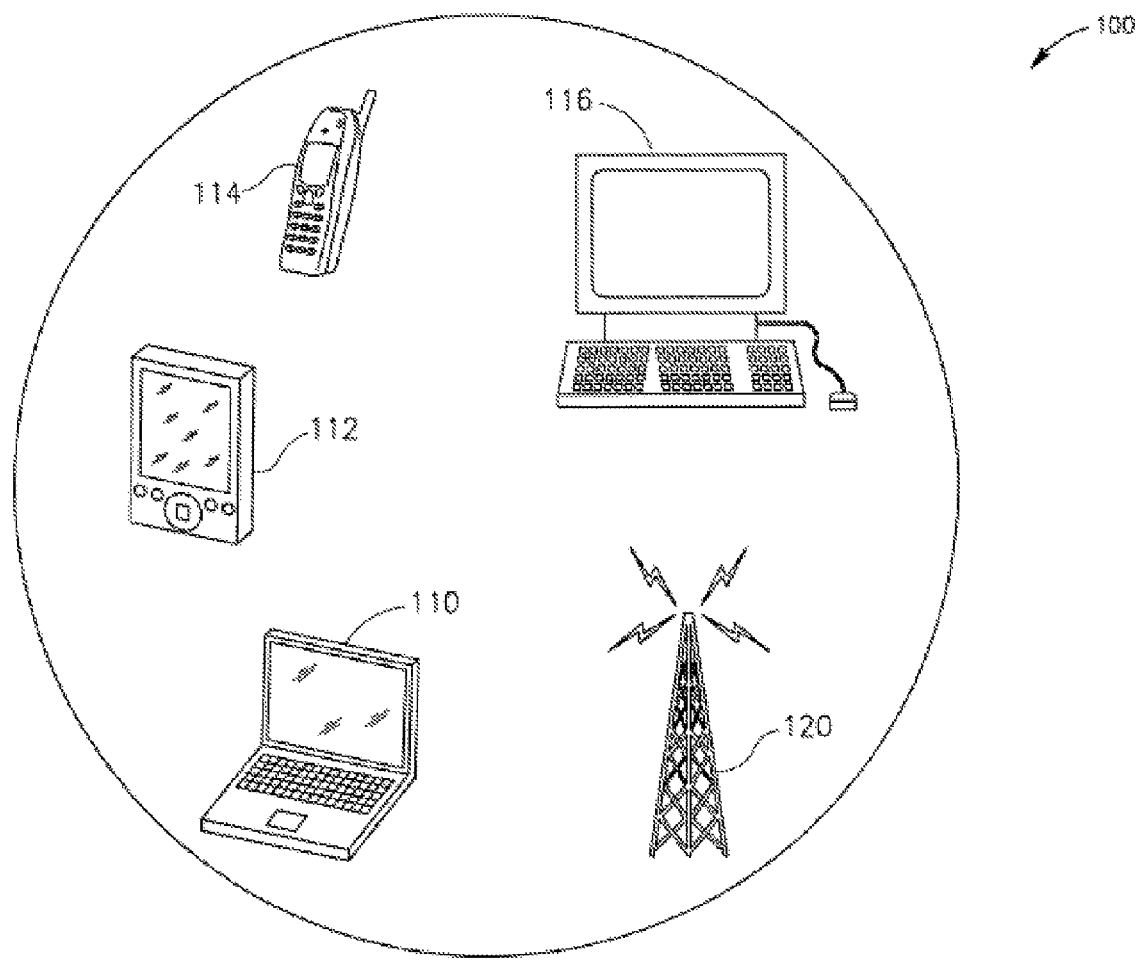
FIG. 1 is a block diagram that illustrates a wireless network according to some embodiments.

In the following detailed description, numerous specific details are set forth in order to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," "investigating," "locating," "decoding," or the like, may refer to the action and/or processes of a computer or computing system comprising a processor or processing circuitry, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following detailed description describes various embodiments of a cell selection mechanism for use in a wireless network by a wireless device, platform, user equipment (UE), subscriber station (SS), station, mobile station (MS) or advanced mobile station (AMS). The various forms of devices described above such as the platform, UE, SS, MS, or AMS are generically referred to throughout the specification as a MS. The MS selects a cell in a network having a number of devices or systems such as a base station (BS), advanced base station (ABS), access point (AP), node, node B, or enhanced node B (eNB), which are generically referred to throughout the specification as a BS. Further, the terms BS, eNB, and AP may be conceptually interchanged, depending on which wireless protocol is being used in a particular wireless network, so a reference to BS herein may also be seen as a reference to either of eNB, ABS, or AP as one example. Similarly, a reference to AMS or SS herein may also be seen as a reference to either of UE or STA as another example. Wireless networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, MS, BS, gateways, bridges, and hubs. Further, the radio systems within the scope of the invention may include cellular radiotelephone systems, satellite systems, personal communication systems (PCS), smartphones, netbooks, two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

In the field of communications, including wireless communications, it would be helpful to provide a cell selection mechanism for radio systems including BS(s) and MS(s) that belong to one or more types of open subscriber groups (OSGs) and/or closed subscriber groups (CSGs). The MS(s) communicate over one or more carriers in a wireless network, wherein the wireless network may comprise one or more macrocells, microcells, picocells, and/or femtocells, herein referred to as a cell.

Communications can be initiated over a carrier such as a primary carrier. A primary carrier can be a carrier on which a BS and a MS exchange traffic and Physical layer (PHY)/Media Access Control (MAC) layer control information. Further, the primary carrier can be used to communicate control functions for MS operation, such as network entry wherein each MS has a carrier that the MS considers to be its primary carrier in a cell. For communications already established over a primary carrier, a BS may prompt a MS to change from the primary carrier to a secondary carrier, thereby switching the primary carrier to another carrier.

In an embodiment, one or more cells are deployed wherein each cell is associated with one or more OSG(s) and/or CSG(s) of MS(s), wherein each CSG or OSG comprises one or more MS(s). A BS configured to deploy a cell to an OSG admits and provides service to a user or MS without a need for membership. A BS configured to deploy a cell to a CSG admits and provides service to a user or MS if the user has a membership with the BS. A MS that is not a member to a BS having a CSG cell may try to connect to the BS with the CSG cell and the BS may not know whether the MS is a member of the CSG. For example in IEEE P802.16m™, "IEEE Standard for Local and metropolitan area networks—Part 16: Air Interface for Broadband Wireless Access Systems—Advanced Air Interface," the MS may not provide an assigned MAC identifier (ID) during initial connection for security reasons. In this example, the MS provides a pseudo randomly generated MAC ID to the BS during initial ranging. The BS will not be able to confirm whether the MS is a member of the BS until later in a network entry process after an authentication process has been completed for the MS in the network.

It would be helpful to provide systems and methods for a quick and efficient mechanism to determine whether a MS is a member of a BS very early in an initial network entry process. It would also be helpful to provide a process for redirecting the MS to other cells in the network if the MS is not a member of the BS.

Reference is made to FIG. 1, which schematically illustrates a wireless network 100 according to embodiments of the invention. Wireless network 100 may include one or more BS 120, and one or more MS 110, 112, 114, and/or 116, which may be for example mobile or fixed stations. Reference herein to the MS 110 may represent stations 110, 112, 114, and/or 116. The terms base station and mobile station are used merely as an example throughout this specification and their denotation in this respect is in no way intended to limit the inventive embodiments to any particular type of network or protocols. The MS 110, 112, 114, and/or 116 may be configured for communication over a single carrier or over a plurality of carriers, including a primary carrier and one or more secondary carriers. The base station 120 may also be configured for communication over one or a plurality of carriers, such as in a multiple-input multiple-output (MIMO) configuration.

Wireless network 100 may facilitate wireless access between each of MS 110, 112, 114, and/or 116 and BS 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™—1999; IEEE 802.11b™—1999/Corl2001; IEEE 802. IIg™—2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.162004/Corl-2005 or IEEE Std 802.16—2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™), Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3rd Generation Partnership Project (3GPP), Fourth Generation (4G), Long Term Evolution (LTE) cellular network or any protocols for WLANs or WWANs.

Embodiments of the invention may enable the next generation of mobile WiMAX systems (e.g., based on IEEE 802.16m, IEEE 802.16e, or IEEE 802.16ac standards) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, the BS 120 may manage and/or control wireless communications among MS 110, 112, 114, and/or 116 and between MS 110, 112, 114, and/or 116 and the BS 120. Mobile stations 110, 112, 114, and/or 116 may, in turn, facilitate various service connections of other devices (not shown) to wireless network 100 via a private or public local area network (LAN), although the embodiments are not limited in this respect.

Figure 2:
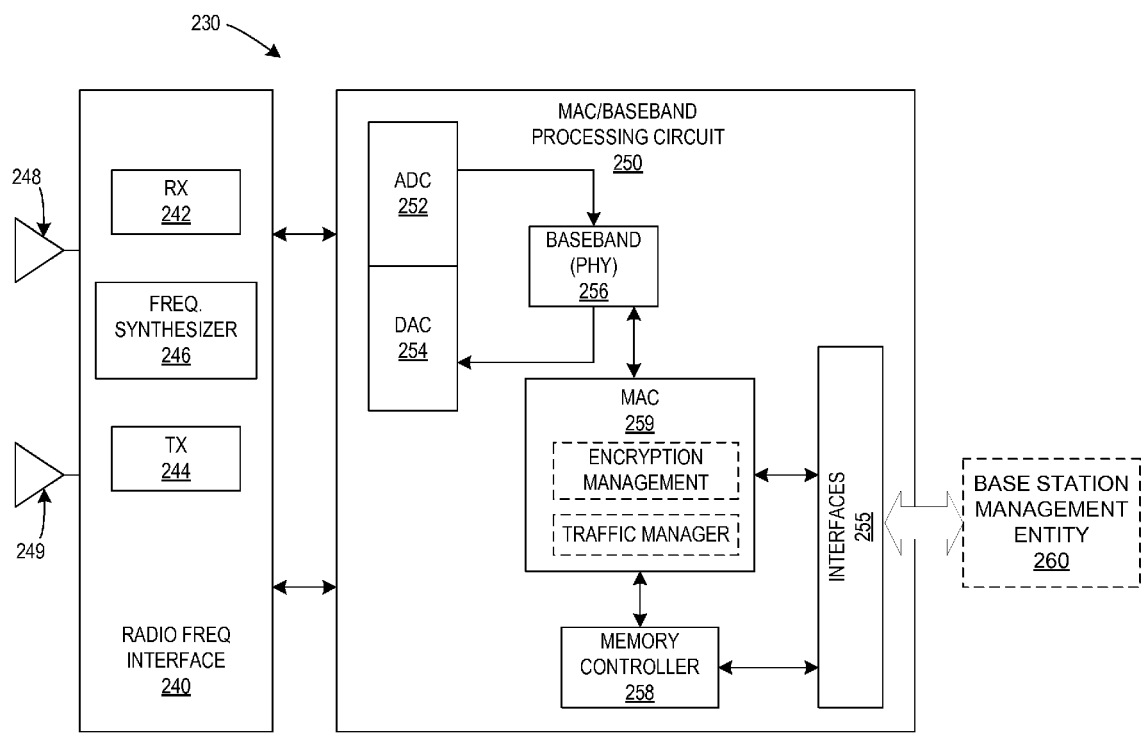
FIG. 2 is a schematic that illustrates an apparatus for use in the wireless network according to some embodiments.

Reference is made to FIG. 2, which schematically illustrates an apparatus 230 for use in the wireless network 100 according to embodiments of the invention. For example, apparatus 230 may be the MS 110 or BS 120 illustrated and described in reference to FIG. 1 for communicating with other MS 110 or BS 120 in a wireless network (e.g., wireless network 100 of FIG. 1). Apparatus 230 may include a controller or processing circuit 250 including logic (e.g., including hard circuitry, processor and software, or a combination thereof). In some embodiments, apparatus 230 may include a radio frequency (RF) interface 240 and/or a medium access controller (MAC)/baseband processing circuit 250.

In one embodiment, RF interface 240 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. The RF interface 240 may include, for example, a receiver 242, a transmitter 244 and/or a frequency synthesizer 246. The RF interface 240 may include bias controls, a crystal oscillator and/or one or more antennas 248 and/or 249. In another embodiment, RF interface 240 may use external voltage-controlled oscillators (VCOs), surface acoustic wave filters, intermediate frequency (IF) filters and/or RF filters, as desired. Due to the variety of potential RF interface designs, an expansive description thereof is omitted.

The processing circuit 250 may communicate with the RF interface 240 to process, receive and/or transmit signals and may include, for example, an analog-to-digital converter 252 for down converting received signals, a digital-to-analog converter 254 for up converting signals for transmission. Further, the processing circuit 250 may include a baseband or physical layer (PHY) processing circuit 256 for PHY link layer processing of respective receive/transmit signals. Processing circuit 250 may also include, for example, a processing circuit 259 for medium access control (MAC)/data link layer processing. Processing circuit 250 may include a memory controller 258 for communicating with processing circuit 259 and/or a base station management entity 260, for example, via interfaces 255.

In some embodiments of the present invention, PHY processing circuit 256 may include a frame construction and/or detection module, in combination with additional circuitry such as a buffer memory, to construct and/or deconstruct super-frames. Alternatively or in addition, MAC processing circuit 259 may share processing for certain of these functions or perform these processes independent of PHY processing circuit 256. In some embodiments, MAC and PHY processing may be integrated into a single circuit if desired.

Apparatus 230 may be, for example, the MS 110 or BS 120 a hybrid coordinator, a wireless router, a NIC and/or network adaptor for computing devices or other device suitable to implement the inventive methods, protocols and/or architectures described herein. Accordingly, functions and/or specific configurations of apparatus 230 described herein, may be included or omitted in various embodiments of apparatus 230, as suitably desired. In some embodiments, the apparatus 230 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 230 may be implemented using single input single output (SISO) architectures. However, as shown in FIG. 2, certain implementations may include multiple antennas (e.g., antennas 248 and 249) for transmission and/or reception using adaptive antenna techniques for beamforming or spatial division multiple access (SDMA) and/or using MIMO communication techniques.

The components and features of apparatus 230 including a context retain timer may be implemented using any combination of discrete circuitry, application specific integrated circuits (ASICs), logic gates and/or single chip architectures. Further, the features of apparatus 230 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 230 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

The BS 120 provides access to one or more Closed Subscriber Groups (CSG) and/or Open Subscriber Groups (OSG) of MS 110, wherein each CSG or OSG comprises one or more MS 110. In a CSG, access and services are restricted to authorized MS 110 that are members of the CSG. In one embodiment, a CSG is a set of users authorized by a BS 120 to have reserved or privileged access to a service provided through the BS 120. The credentials or electronic certificates can be provided to the MS 110 by the cellular system operator at the time of subscription or at some later time. The serving BS 120 may have the knowledge (through MS 110 context generated following session setup) of the CSGs where the MS 110 may have access. The OSGs, on the other hand, are publicly accessible and no specific subscription is required. The MS 110 may still have to be authenticated by the operator's network to access an OSG.

During normal operation and as part of handover, the MS 110 can measure a received RF signal strength from a serving and neighboring BS 120 and select the most viable candidate base stations as targets for handover. The measurements may be conducted on synchronization sequences that are unique to each BS 120 and further carry the Cell Identification (Cell_ID) or Physical Layer (PHY) level identifier. The MS 110 may be able to determine a type of BS 120 based on the detected Cell_ID and other information. The cell type may also be communicated via the synchronization sequences if a hierarchical synchronization scheme is utilized. Since a number of bits that can be carried through the synchronization sequences are limited, additional information on the cell type and other configuration restrictions are broadcasted as part of system configuration information.

As an example, in some IEEE 802.16m embodiments, there are two stages of Downlink (DL) synchronization. The DL synchronization is achieved by successful acquisition of the primary advanced preamble. The primary advanced preamble carries information about base station type (e.g., macro BS or femto BS), system bandwidth (e.g., 5, 10, 20 MHz) and multi-carrier configuration (i.e., fully configured or partially configured RF carrier). Once the primary advanced preamble is detected, the MS 110 proceeds to acquisition of the secondary advanced preambles. In an embodiment, the secondary advanced preamble carries a set of 768 distinct Cell_IDs that have been partitioned into a number of subsets where each subset corresponds to a certain type of base station (e.g., closed/open subscriber group femto base stations or macro base stations). However, fewer or additional Cell_IDs may be used in additional embodiments.

In some embodiments, the MS 110 may acquire the synchronization sequences, to detect the Cell_ID, followed by detection of the broadcast channel to complete the cell selection. If the MS 110 realizes that the cell is a non-accessible BS 120, the MS 110 restarts the cell search and select another cell.

Upon successful acquisition of system timing and cell identification, the MS 110 may attempt to detect and decode the system configuration information. This information is carried via the Superframe Headers (SFH) in some IEEE 802.16m embodiments. The superframe headers, comprising Primary and Secondary Superframe Headers (P-SFH and S-SFH), are control elements that are periodically (while a large part of this information remains unchanged over a long period of time, some parts may change more frequently) broadcasted using a robust and reliable transmission format to ensure the information can be correctly detected by all MSs 110 in the coverage area of a BS 120. The correct and timely detection of the system information is essential for successful network entry/re-entry and handover. The S-SFH content is divided into three sub-packets (SP1, SP2, and SP3) where sub-packets carry essential information for various system processes such as initial network entry, network re-entry, Idle-State operation, etc. according to their respective timing sensitivity.

Once the system parameters are successfully acquired, the cell selection can be made taking certain considerations into account. For example, the MS 110 may have a preference in selecting a specific type of BS 120 (e.g., a femtocell in indoor environment) even though other types of the BS 120 may be available or the MS 110 may not be authorized to access a group of BSs 120 despite the fact that their received RF signal strength might be good.

Access State is a state where the MS 110 performs network entry to a selected or targeted BS 120. In some IEEE 802.16m embodiments, the Access State may comprise the following procedures: 1) Initial ranging and uplink synchronization, 2) Basic capability negotiation, 3) Authentication, authorization, and key exchange, and 4) Registration with the BS. The MS 110 receives specific user identification as part of Access State procedures. Ranging is a process of acquiring correct timing offset, frequency offset and power adjustments so that AMS transmissions are aligned with an ABS, and they are received within appropriate reception thresholds.

In a WiMAX wireless embodiment, such as in some IEEE 802.16m embodiments, a BSID of a BS 120 is 48 bits in length and the BSID is a unique MAC identifier to identify the BS 120. A CSG identifier (CSGID) is an identity used by a CSG cell that may be provided by the BS 120 and/or provisioned in the MS 110 to facilitate access to services for MS 110 members. Further, the BS 120 may broadcast that the BS 120 is an open subscriber group (OSG) BS 120 or a closed subscriber group (CSG) BS 120. However, the MS 110 may not know if the MS 110 is a member to the CSG provided by the BS 120.

Figure 3:
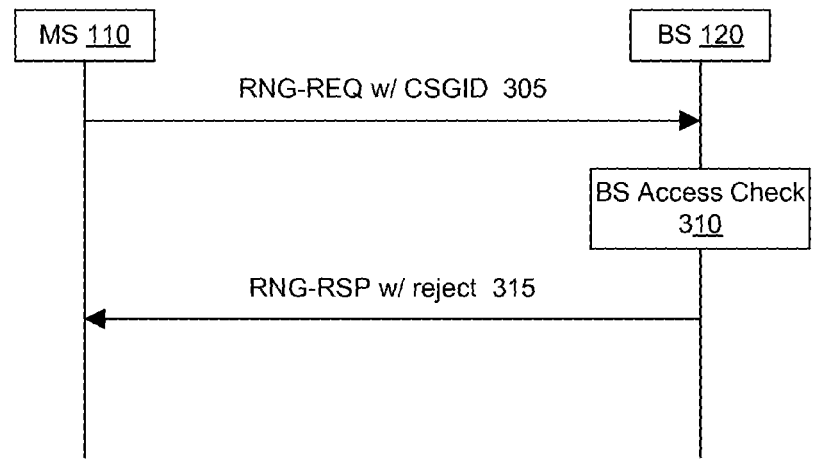
FIG. 3 is a diagram illustrating unicast messaging according to some embodiments.

Embodiments of unicast messaging for efficient cell selection are provided in reference to FIG. 3. In an embodiment using 802.16m as a network protocol, when a MS 110 attempts to perform initial network entry or re-entry with a BS 120, the MS 110 performs initial ranging by sending an AAI_RNG-REQ message with a number of identifiers, such as one or more CSGID(s). The number of identifiers may be provisioned in the MS 110 or otherwise received by the MS 110 prior to initial ranging. The number of identifiers, meaning one or more identifiers, are sent with, in, or along with the AAI_RNG-REQ message to the BS 120.

As illustrated in FIG. 3, the MS 110 transmits a range request (RNG-REQ) 305 signal to the BS 120 during initial ranging. In alternate embodiments, the MS 110 transmits a unicast message such as a privacy key management (PKM) or a registration request (REG-REQ) message to the BS 120. The BS 120 may also have a number of identifiers provisioned in the BS 120, such as one or more CSGID(s) or other identifier(s). For example, if the BS 120 is a CSG BS 120 then the BS 120 may also have one or more CSGID(s) provisioned in the BS 120 as well. If the BS 120 is an OSG BS 120, then there will be no identifier or CSGID provisioned for the BS 120.

The BS 120 receives the unicast message and performs a BS access check 310 to determine if the BS 120 is accessible by the MS 110. If the BS 120 is an OSG BS 120, then the BS 120 ignores the identifier(s) or CSGID(s) (if sent by the MS 110) in the RNG-REQ message and goes ahead with the next steps. For example, the MS 110 and the BS 120 may continue with initial ranging as the next steps in this embodiment.

If the BS 120 is a CSG BS 120, the BS 120 receives the AAI_RNG-REQ message and looks at the received CSGID(s) and checks if it matches with at least one of its CSGID(s), wherein the CSGID(s) may be provisioned in the BS 120 or otherwise received by the BS 120. If there is a match of the identifier(s) or CSGID(s), then the BS 120 knows that the MS 110 is a member of the BS 120 and goes ahead with the next steps. During an authentication process, the MS 110 may fail authentication if a MAC ID of the MS 110 is not the true MAC ID of the MS 110 and can be rejected from entering the BS 120.

If the received CSGID(s) or identifier(s) from the MS 110 do not match any of the CSGID(s) of the BS 120 itself, then the BS 120 determines that the MS 110 is not a member of the BS 120 and therefore cannot be granted access. In this case, the BS 120 sends a range response (RNG-RSP) 315 message or a registration response (REG-RSP) message to indicate a rejection of access for the MS 110. In order to help the MS 110 to attach to nearby or neighboring BS 120, the BS 120 provides "redirection info" to the MS 110 in the AAI_RNG-RSP message. The redirection info consists of the base station identifier (BSID), preamble index, and center frequency of other nearby cells.

If the BS 120 has CSGID info of nearby BS 120, then the BS 120 can filter the redirection info based on the CSGID(s) provided by the MS 110 in the AAI_RNG-REQ message and only provide the OSG BS 120 as well as matching CSGID BS 120 to the MS 110 in the redirection info. The MS 110 then can use the redirection info and try to attach to the other candidate BS 120. In reference to FIG. 3, the MS 110 may be an AMS and the BS 120 may be an ABS in one embodiment, however the embodiment is not so limited.

Figure 4:
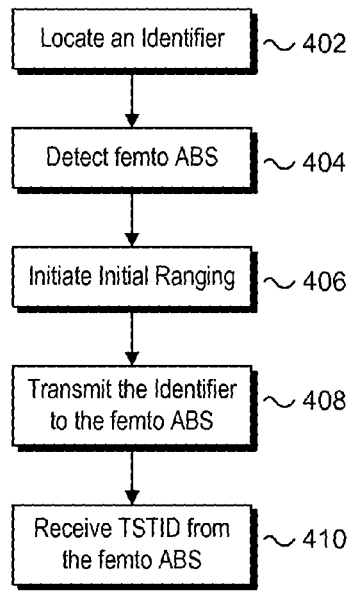
FIG. 4 is a diagram illustrating a cell reselection mechanism according to some embodiments.

FIG. 4 is a diagram illustrating a cell reselection mechanism according to some embodiments. The method may be performed by the MS 110 such as the apparatus 230 comprising one or more antenna 248, 249, the RF interface 240, and the processing circuit 250 wherein the processing circuit 250 is configured to execute elements of the methods described herein.

In element 402, the MS 110 locates an identifier. The identifier may be provisioned in the MS 110 and stored in a memory location within the MS 110 or otherwise received by MS 110. In an embodiment, the identifier is a CSGID and the MS 110 is an AMS. The MS 110 detects a BS 120 in element 404, which may be an OSG or a CSG femto ABS in certain embodiment. Further, the MS 110 may synchronize with the BS 120.

The MS 110 initiates initial ranging with the BS 120 wherein the MS 110 generates a range request (AAI_RNG-REQ) message in element 406. The identifier is also transmitted to the BS 120 with the AAI_RNG-REQ message in element 408. The MS 110 receives a station identifier (STID) from the BS 120 in element 410, wherein the STID may also be a temporary STID (TSTID). The MS 110 may perform network entry with the BS 120 if the MS 110 is a subscriber to a CSG provided by the BS 120. In another embodiment, the MS 110 is not a member of a CSG provided by the BS 120 and the BS 120 ignores the CSGID from the MS 110.

Figure 5:
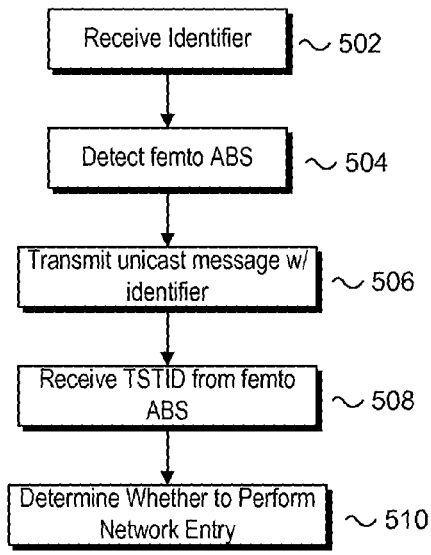
FIG. 5 is a diagram illustrating a cell reselection mechanism according to some embodiments.

FIG. 5 is a diagram illustrating a cell reselection mechanism according to some embodiments. In element 502, a MS 110 receives an identifier such as a CSGID, wherein the CSGID may be one of a number of CSGIDs provisioned in the MS 110 or the CSGID may be received by the MS 110 such as through a wired transfer or an over-the-air (OTA) transfer. A femto ABS is detected in element 504 by the MS 110 and a unicast message is transmitted from the MS 110 to the femto ABS in element 506 wherein the unicast message includes the identifier from the MS 110. A STID or TSTID is received from the femto ABS in element 508 to indicate that the MS 110 is a member of a closed subscriber group (CSG) provided by the femto ABS. The MS 110 may then determine whether to perform network entry with the femto ABS in element 510.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A method to initiate network entry by an advanced mobile station (AMS), comprising:
   detecting a femto advanced base station (ABS);
   locating a closed subscriber group identifier (CSGID) in the AMS;
   generating an advanced air interface range request (AAI_RNG-REQ) message;
   initiating initial ranging with the femto ABS by transmitting the CSGID and the AAI_RNG-REQ message to the femto ABS; and
   receiving a station identifier (STID) from the femto ABS.

2. The method of claim 1, further comprising synchronizing the AMS with the femto ABS.

3. The method of claim 1, wherein the femto ABS is a closed subscriber group (CSG) femto ABS that checks the received CSGID to determine if there is a match with a second CSGID in the femto ABS.

4. The method of claim 3, wherein the AMS is a member of the femto ABS.

5. The method of claim 1, wherein the femto ABS is an open subscriber group (OSG) femto ABS that ignores the CSGID from the AMS.

6. A method to initiate network entry by an advanced mobile station (AMS), comprising:
   receiving a closed subscriber group identifier (CSGID);
   detecting a femto advanced base station (ABS);
   transmitting a first unicast message from the AMS to the femto ABS, wherein the unicast message includes the CSGID from the AMS; and
   receiving a second unicast message from the femto ABS, wherein the second unicast message indicates rejection of access to the femto ABS by the AMS and the second unicast message includes redirection info for the AMS.

7. The method of claim 6, wherein the first unicast message is an advanced air interface range request (AAI_RNG-REQ) message and the second unicast message is an advanced air interface range response (AAI_RNG-RSP) message.

8. The method of claim 6, wherein the femto ABS compares the CSGID from the AMS to a number of femto ABS CSGIDs.

9. The method of claim 8, wherein the redirection info comprises an ABS identifier, a preamble index, and a center frequency of another cell.

10. The method of claim 8, wherein the CSGID from the AMS does not match any of the number of femto ABS CSGIDs.

11. The method of claim 9, further including receiving filtered redirection info from the femto ABS based on the CSGID provided by the AMS.

12. The method of claim 11, wherein the filtered redirection info provides information on an OSG femto ABS and a second CSG femto ABS having a matching CSGID to the AMS.

13. An advanced mobile station (AMS) for initiating network entry, comprising:
   an antenna;
   a radio frequency (RF) interface configured to receive a broadcast message from a femto advanced base station (ABS); and
   processing circuitry configured to:
      locate a closed subscriber group identifier (CSGID) in the AMS;
      generate a unicast message;
      initiate initial ranging with the femto ABS by transmitting the CSGID and the unicast message to the femto ABS, wherein the femto ABS is a closed subscriber group (CSG) femto ABS that is configured to check the received CSGID to determine if there is a match with a second CSGID in the femto ABS.

14. The AMS of claim 13, wherein the unicast message is an advanced air interface range request (AAI_RNG-REQ) message.

15. The AMS of claim 13, wherein the AMS is a member of the femto ABS.

16. The AMS of claim 13, wherein the femto ABS is an open subscriber group (OSG) femto ABS that ignores the CSGID from the AMS.

17. An advanced mobile station (AMS) for selecting a cell in a wireless network, comprising:
   an antenna;
   processing circuitry configured to locate aclosed subscriber group identifier (CSGID) in the AMS; and
   a radio frequency (RF) interface configured to:
      receive a broadcast message from a femto advanced base station (ABS);
      transmit an advanced air interface range request (AAI_RNG-REQ) message from the AMS to the femto ABS, wherein the AAI_RNG-REQ message includes the CSGID; and
      receive an advanced air interface range response (AAI_RNG-RSP) message from the femto ABS, wherein the AAI_RNG-RSP message indicates rejection of access to the femto ABS by the AMS and the AAI_RNG-RSP message includes redirection info for the AMS.

18. The AMS of claim 17, wherein the RF interface is further configured to transmit a plurality of CSGIDs to the femto ABS for the femto ABS to compare against CSGIDs in the femto ABS.

* * * * *